United States Patent [19]

Melody et al.

[11] Patent Number: 4,812,951
[45] Date of Patent: Mar. 14, 1989

[54] ELECTROLYTIC CAPACITOR AND ELECTROLYTE THEREFOR

[75] Inventors: Brian Melody, Greencastle; James A. Clouse, Lebanon, both of Ind.

[73] Assignee: Aerovox M, Inc., Glaskow, Ky.

[21] Appl. No.: 28,221

[22] Filed: Mar. 20, 1987

[51] Int. Cl.[4] .......................... H01G 9/00; H01G 5/22
[52] U.S. Cl. ..................................... 361/504; 252/62.2
[58] Field of Search ..................... 252/62.2; 361/433

[56] References Cited

U.S. PATENT DOCUMENTS

| | | | |
|---|---|---|---|
| 3,300,693 | 1/1967 | Ross et al. | 361/433 |
| 3,487,270 | 12/1969 | Alwitt | 252/62.2 X |
| 3,551,755 | 12/1970 | Bode et al. | 252/62.2 X |
| 4,476,517 | 10/1984 | Fresia | 361/433 |
| 4,479,167 | 10/1984 | Ross et al. | 361/433 |
| 4,541,037 | 9/1985 | Ross et al. | 361/433 |

Primary Examiner—Donald A. Griffin
Attorney, Agent, or Firm—Willian Brinks Olds Hofer Gilson & Lione

[57] ABSTRACT

An electrolytic capacitor includes a pair of electrodes, one of which is composed of a film-forming metal and an electrolyte comprising substantially one volume of dimethyl sulfoxide and substantially three volumes of a member of a solvent group consisting of N-ethyl-2-pyrrolidone, N-methyl pyrrolidone, butyrolactone, propylene carbonate and substituted cyanamides such as diallyl cyanamide, and mixtures thereof. Preferably the electrolyte also includes from 3 volume % to 10 volume % phosphoric or phosphorous acid and an ionogen, such as an amine salt.

10 Claims, 1 Drawing Sheet

ELECTROLYTIC CAPACITOR AND ELECTROLYTE THEREFOR

FIELD OF THE INVENTION

The invention in general relates to electrolytic capacitors and electrolytes used in such capacitors and more particularly to a capacitor having an aprotic electrolyte.

DESCRIPTION OF PRIOR ART

It has been known for some time to use dimethyl sulfoxide (DMSO) as a component in an electrolyte for electrolytic capacitors, and in particular in combination with butyrolactone and N-methyl pyrrolidone. See, fOr example, U.S. Pat. No. 3,487,270 issued to Robert S. Alwitt. Although it is known that concentrations of DMSO greater than 20% are useful, the study of electrolytes using DMSO has been primarily in concentrations of 50 volume % or more because it has been thought that such high concentrations are necessary to obtain good performance and stability over a wide range of operating conditions. The Alwitt patent mentioned above in fact teaches that the performance of electrolytes containing DMSO and numerous other solvents including butyrolactone and N-methyl pyrrolidone continues to improve to concentrations up to and beyond 50 volume % DMSO.

It also has been known to employ phosphoric acid in capacitor electrolytes, although generally this has been limited to relatively small quantities in the range 0.1-1.0 weight % due to the low solubility of phosphoric acid and the tendency of higher concentrations of phosphoric acid to reduce sparking voltage. See, for example, U.S. Pat. No. 4,578,204 issued to Daniel J. Anderson and U.S. Pat. No. 4,541,037 issued to Sidney D. Ross and Manuel Finkelstein. The latter patent indicates that when using ethylene glycol, dimethyl formamide (DMF), N-methyl pyrrolidone and butyrolactone as solvents with substituted ammonium dihydrogen phosphates sparking voltages of up to 425 volts may be obtained at relatively high (up to 4.8 wt. %) concentrations of phosphate.

SUMMARY OF THE INVENTION

We have discovered that the performance of an electrolyte containing DMSO is optimized at a DMSO concentration of about 25 volume It has further been discovered that although phosphates and phosphites are less soluble in DMSO than in the solvents discussed in the Ross and Finkeltein patent mentioned above, very high concentrations (5% and greater) of phosphoric acid and phosphorous acid are possible in a solvent having an approximately 1 to 3 concentration ratio of DMSO to a member of a group consisting of N-ethyl-2-pyrrolidone, N-methyl pyrrolidone, butyrolactone, propylene carbonate, and substituted cyanamides such as di-alkyl cyanamide, and mixtures thereof, and that sparking voltage as high as 520 volts can be obtained.

It is an object of the invention to provide a capacitor electrolyte having high sparking voltage and low resistivity over a wide temperature range.

The invention provides a liquid electrolyte solvent for an electrolytic capacitor comprising no more than 30 vol % dimethyl sulfoxide and 65 vol % to 80 vol % of a member of a solvent group consisting of N-ethyl-2-pyrrolidone, N-methyl pyrrolidone, butyrolactone, propylene carbonate, and substituted cyanamides such as di-alkyl cyanamides, and mixtures thereof. Preferably the ratio of concentration of the DMSO and the member of the solvent group is substantially 1 to 3in terms of volume. Preferably the electrolyte includes a member of an acid group consisting of phosphoric acid, phosphorous acid, and mixtures thereof. Preferably the concentration of the acid group member is substantially 5 volume % of an 85% acid solution.

The invention also provides an electrolytic capacitor comprising a pair of electrodes, at least one of which is composed of a film-forming metal and an electrolyte comprising substantially one volume of dimethyl sulfoxide and substantially three volumes of a member of a solvent group consisting of N-ethyl-2-pyrrolidone, N-methyl pyrrolidone, propylene carbonate, butyrolactone, and substituted cyanamides such as di-alkyl cyanamide, and mixtures thereof.

The electrolyte and capacitor provided by the invention not only provides one of the highest performing capacitors available in terms of high sparking voltage and low resistivity, but the performance is high over a temperature wide range from $-55°$ C. to $125°$ C. Further the invention makes possible for the first time a practical high performance capacitor that does not contain toxic materials. Numerous other features, objects and advantages of the invention will become apparent from the following-detailed description when read in conjunction with the accompanying drawings.

DESCRIPTION OF THE PREFERRED EMBODIMENT

Figure 1:
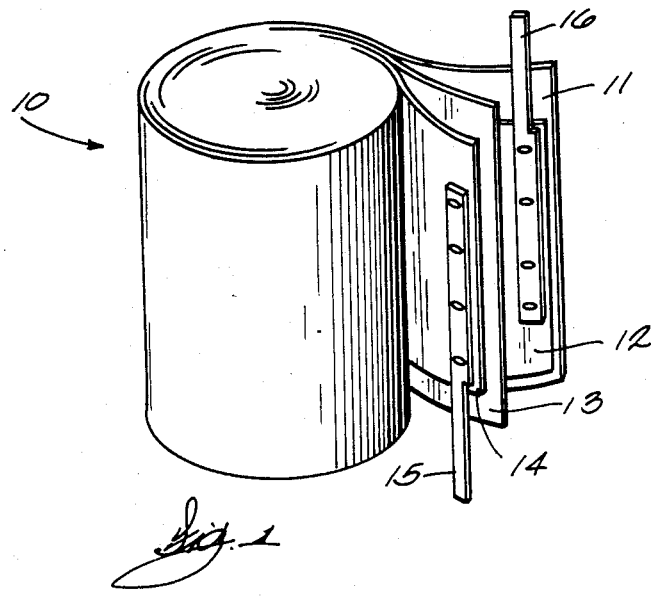
FIG. 1 is a perspective view of an exemplary partially unwound capacitor electrode body.

Referring now to FIG. 1, there is shown an electrolytic capacitor electrode body of the wound foil type denoted generally by reference numeral 10. Electrode body 10 comprises anode 12 of film-forming metal (e.g., aluminum, tantalum, niobium, zirconium) having on its surface an oxide film which functions as the active dielectric for the capacitor. The dielectric oxide film is formed on anode 12 in accordance with the accepted anodization techniques. Cathode 14 may be comprised of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10. Tabs 15 and 16 may extend from the same or opposite ends of the capacitor.

Figure 2:
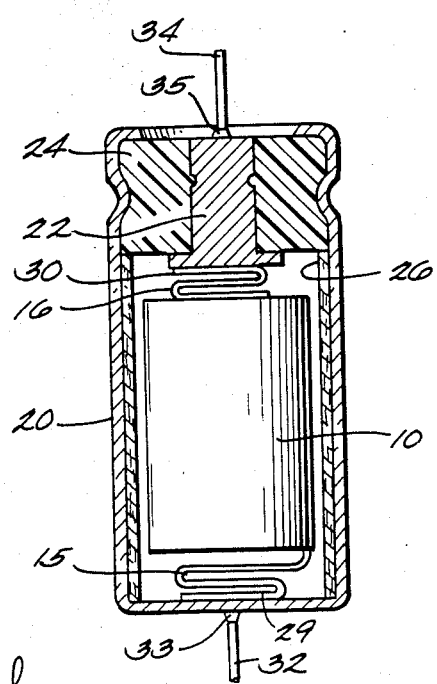
FIG. 2 is a cross section of an exemplary capacitor.

Turning to FIG. 2, the capacitor body 10 is placed in a housing 20, which preferably is an aluminum can. The housing 20 also contains a terminal insert 22, preferably made of metal, an insulating plug 24, preferably make of plastic, silicone rubber or other similar material, and a spacer 26 preferably made of polypropylene or other insulating material. The cathode tab 15 is connected to the bottom of can 20 preferably by a weld 29, while the anode tab 16 is connected to the bottom of insert 22 preferably by a weld 30. External cathode lead 32 is connected to exterior bottom surface of can 20 preferably by a weld, and external anode lead 34 is connected to the top of insert 22 preferably by a weld 35. It is understood that the capacitor shown is exemplary and is not intended to be limiting as such capacitors can take on many forms depending on their specific applications.

The electrolyte of the present invention comprises a solvet including about 25% by volume of dimethyl sulfoxide (DMSO) and about 75% of a member of a group consisting of N-ethyl-2-pyrrolidone (NEP), N-methyl pyrrolidone, butyrolactone, propylene carbonate and substituted cyanamides such as di-alkylcyanamide, and mixtures thereof.

EXAMPLE I

This example provides six exemplary electrolytes having different amounts of phosphate in the form of phosphoric acid added. A solvent of 150 ml (milliliters) of NEP (143.4 grams), 50 ml of DMSO (55.3 grams) was formed and to this was added 2.5 grams of p-nitrobenzoic acid, 33.5 grams of tri-n-propylamine, 14.5 grams of acetic acid and from zero to 24 grams of phosphoric acid with the results shown in Table 1 and Table 2.

TABLE 1

| PHOSPHATE WT % | SPARKING VOLTAGE | CURRENT |
| --- | --- | --- |
| 0.0 | 320 | See Table 2 |
| 1.0 | 415 | 0.01 amperes |
| 3.0 | 450 | 0.01 amperes |
| 5.0 | 520 | 0.01 amperes |
| 7.0 | 470 | 0.01 amperes |
| 10.0 | 450 | 0.01 amperes |

The current for the zero phosphate example is given in Table 2.

TABLE 2

| |
| --- |
| 0.03 A @ 70 V |
| 0.05 A @ 130 V |
| 0.10 A @ 180 V |
| 0.15 A @ 220 V |
| 0.20 A @ 270 V |

The 10.0 WT % phosphate corresponds to 24 grams of 85% phosphoric acid. The sparking voltage was performed with standard 600 volt preformed tab stock at 30° C.

Table 1 indicates that the preferred amount of phosphoric acid is 5% by weight which corresponds to 12 grams in the example given. With this amount of phosphoric acid, the resistivity measured 1350 ohm-cm at 30° C. and the pH was 7.3. The sparking voltage of this sample was also measured with 360 volt preformed foil and was 415 volts at 30° C.

From the above, it can be seen that the apparent pH is above 7 in spite of the great excess of phosphoric acid present above the stoichiometric amount of acid required to "neutralize" the tri-n propylamine. (The amount of acetic acid present is sufficient for this.) The ability of the solvent system to buffer the acidity is an indication of the aprotic nature of the solvent system. By "aprotic" is meant that the hydrogen ion transfer is low.

EXAMPLE 2

Another electrolyte was made that was identical to the above electrolyte except that phosphorous acid was used instead of phosphoric. Specifically, a solvent of 150 ml of NEP (143.4 grams), 50 ml of DMSO (55.3 grams) was formed and to this was added 2.5 grams of p-nitrobenzoic acid, 33.5 grams of tri-n-propylamine, 14.5 grams of acetic acid and 12 grams of phosphorous acid. The resulting electrolyte had a sparking voltage of 440 volts at 30° C. and a resistivity of 940 ohm-cm (30° C.).

EXAMPLE 3

An electrolyte was made that was the same as the electrolyte of Example 2 except that 33.5 grams of tri-ethyl-amine was substituted for the tri-n-propylamine. The resulting electrolyte had a sparking voltage of 430 volts at 30° C. and a resistivity of 720 ohm-cm (30° C.).

From the above examples it can be seen that the electrolyte containing phosphorous acid tends to have lower sparking voltages than those containing phosphoric, though the sparking voltages are still in the very high range. Importantly, the resistivity decreases to between 30% and 50% of the resistivity with phosphoric acid.

EXAMPLE 4

Another electrolyte was made with butyrolactone substituted for the NEP. This example was compared to an electrolyte where butyrolactone alone was used for a solvent and resistance tests were performed for the two electrolyte systems. Each electrolyte included 100 ml of liquid with one solution being completely butyrolactone and the other solution being 75 ml of butyrolactone with 25 ml of dimethyl sulfoxide. Both solutions included 4.3 grams of tri-propylamine and 11.6 grams of maleic acid. Table 3 shows the resistance of these mixtures at various temperatures.

TABLE 3

| | butyrolactone | butyrolactone plus dimethyl sulfoxide |
| --- | --- | --- |
| 30° C. | 390 ohms | 200 ohms |
| 25° C. | 150 ohms | 115 ohms |
| 105° C. | 125 ohms | 100 ohms |

The data shows that the solution not including dimethyl sulfoxide had a resistance which changed by a factor of 3 to 1 between the lowest temperature of 30° C. and the highest temperature of 105° C., while the solution including dimethyl sulfoxide had a resistance which changed by a factor of only 2 to 1 over the same temperature range. This leveling contributes to lower E.S.R. levels at lower temperatures and higher practical operating voltage levels at elevated temperatures. A similar level effect was also noted when using 25 vol % dimethyl sulfoxide with 75 vol % of the other solvents mentioned.

As can be seen from the above examples, in addition to the DMSO and the other solvents an amine salt and a forming agent are used. The amine salt tends to ionize the electrolyte. Any suitable amine salt for this purpose may be used. The forming agent may be selected from the group consisting of boric acid, phosphoric acid, water, p-nitro benzoic acid, chromic acid and others.

A feature of the invention is the "aprotic" nature of the DMSO solvent. With the DMSO, the ionizing effect and aproticity is far higher than can be expected from the amine salt with other solvents especially with the NEP. Apparently, the DMSO complexes with the protonated amine (or other salt) to provide significant additional ionicity. This can be seen by comparing the resistance of butyrolactone alone with that of the butyrolactone - DMSO solution as shown in Table 3.

This complexing feature of the DMSO can also be seen in the low temperature performance of the 25% DMSO 75% other solvent system. Generally DMSO would not be preferable to use with electrolytic capacitors as it has a freezing point of over +18° C. This has been thought to inhibit performance of the dielectric fluid at low temperatures. The present invention has shown this to not be correct, however, as the mixture actually improves upon the performance of other organic solvents alone.

Related to the above feature of the invention is the important feature that the performance of the DMSO solution, particularly at low temperatures, increases as one approaches the approximately 25 vol % solution. This is opposite to what was expected prior to the present invention. Perhaps the best expression of this improvement is that the temperature vs. resistivity curve became much flatter as the solution approaches 25 vol % DMSO (See Table 3). The flatness of this curve results in enhanced performance at all temperatures as discussed above in relation to Table 3.

Another important feature of the invention is the greatly enhanced stability of the 25 vol % DMSO/75 Vol % other solvent system. Samples of 25 vol % DMSO with 75 vol % NEP and 25 vol % DMSO with 75 vol % butyrolactone (BLO) were sealed in glass bottles and placed in an oven at 125° C. with the results shown in Table 4.

TABLE 4

| Time | Water Content | |
|---|---|---|
|  | DMSO/BLO | DMSO/NEP |
| 50 hours | 655 ppm | 631 ppm |
| 100 hours | 709 | 632 |
| 250 hours | 902 | 664 |
| 500 hours | 1620 | 726 |
| (500-50 Hrs) | 1620 − 655 = 965 ppm | 726 − 631 = 95 ppm |

It may be seen, then, that the DMSO/NEP is about 10 times less reactive as judged by water production at 125° C. as compared to DMSO/BLO. (Some water was present in all of the solvents initially—numbers are unavailable for the above test; the rate of reaction is the important factor.)

The results of Table 4 show that the 25 vol % DMSO solvent solution is very stable (both for the NEP and BLO) as compared to DMF-containing electrolytes. DMF containing solutions are generally tested at 105° C. rather than 125° C. since they tend to be unstable at 125° C. A sample of the electrolyte of Example 1 was tested for stability 500 hours at 125° C. The results are shown in Table 5.

TABLE 5

|  | Initial | Final | Change |
|---|---|---|---|
| 30° C. resistivity | 1345 ohm cm$^{-3}$ | 1826 ohm cm$^{-3}$ | +35.7% |
| pH | 7.3 | 7.12 | −.18 pH unit |
| % H$_2$0 | .79% | 3.33% | +1.54% |

This shows that the solvent system of Example 1 is very stable compared to prior art solvent systems, which generally are not stable at all at 125° C.

Another feature of the present invention is that the amount of ionogen (amine salt) required to produce a given amount of conductivity is reduced, thus reducing the cost of the electrolyte since ionogens such as amine salts are quite expensive as compared to the solvents. Also, the improved performance of the electrolyte allows thinner separator paper to be used for the same working voltage and by allowing a lower ratio of forming to working voltage. In addition, the dimethyl sulfoxide is less expensive than the butyrolactone and other solvents that it is replacing. These factors of reduced requirements for ionogen, improved performance and decreased material cost all contribute to reducing the cost factor of the resulting capacitors. In addition, DMSO has significantly less toxicity than DMF, which is the primary conventional solvent in the capacitors of the type discussed herein.

A novel capacitor and capacitor electrolyte which has surprisingly high sparking voltage and low resistivity over a wide range of temperatures has been described. It is evident that those skilled in the art may now make many uses and modifications of the specific embodiment described, without departing from the inventive concepts. Consequently, the invention is to be construed as embracing each and every novel feature and novel combination of features present in the electrolyte and capacitor described.

What is claimed is:

1. A liquid electrolyte for an electrolytic capacitor comprising no more than about 30 volume % dimethyl sulfoxide and about 65 to about 80 volume % N-ethyl-2-pyrrolidone.

2. A liquid electrolyte according to claim 1 wherein the volume ratio of dimethyl sulfoxide to N-ethyl-2-pyrrolidone is about 1 to about 3.

3. A liquid electrolyte according to claim 1 further comprising an acid selected from the group consisting of phosphoric acid, phosphorous acid and mixtures thereof.

4. A liquid electrolyte according to claim 3 wherein the concentration of said acid is about 3 to about 10 volume % of an 85% acid solution.

5. A liquid electrolyte according to claim 3 further including an amine selected from the group consisting of Tri-n-propyl-amine, tri-ethyl-amine, and mixtures thereof.

6. A liquid electrolyte according to claim 5 further including acetic acid, propionic acid or p-nitro-benzoic acid.

7. A liquid electrolyte according to claim 1 containing about 25 volume % dimethyl sulfoxide and about 75 volume % N-ethyl-2-pyrrolidone.

8. An electrolyte capacitor comprising a pair of electrodes, at least one of which is composed of film-forming metal and an electrolyte containing no more than about 30 volume % dimethyl sulfoxide and about 65 to about 80 volume % N-ethyl-2-pyrrolidone.

9. An electrolyte capacitor according to claim 8 wherein the volume ratio of dimethyl sulfide to N-ethyl-2-pyrrolidone is about 1 to about 3.

10. An electrolytic capacitor according to claim 8 wherein said electrolyte contains about 25 volume % dimethyl sulfoxide and about 75 volume % N-ethyl-2-pyrrolidone.

* * * * *